(12) United States Patent
Jayakumar et al.

(10) Patent No.: US 10,871,882 B2
(45) Date of Patent: Dec. 22, 2020

(54) EFFICIENT ACCESS TO FREQUENTLY UTILIZED ACTIONS ON COMPUTING DEVICES

(71) Applicant: Samsung Electronics Co., Ltd., Suwon-si (KR)

(72) Inventors: Praveen Jayakumar, Union City, CA (US); Ranhee Chung, San Jose, CA (US); Ruokan He, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/163,477

(22) Filed: Oct. 17, 2018

(65) Prior Publication Data

US 2019/0354244 A1 Nov. 21, 2019

Related U.S. Application Data

(60) Provisional application No. 62/672,209, filed on May 16, 2018.

(51) Int. Cl.
*G06F 3/0482* (2013.01)
*G06F 3/0481* (2013.01)
*G06F 3/16* (2006.01)

(52) U.S. Cl.
CPC ........ *G06F 3/0482* (2013.01); *G06F 3/04817* (2013.01); *G06F 3/167* (2013.01)

(58) Field of Classification Search
CPC ..... G06F 3/0482; G06F 3/04817; G06F 3/167
See application file for complete search history.

(56) References Cited

U.S. PATENT DOCUMENTS

| 9,542,061 | B2 | 1/2017 | Baalu et al. |
| 9,654,988 | B2 | 5/2017 | Weisbart et al. |
| 2012/0060123 | A1 | 3/2012 | Smith |

(Continued)

FOREIGN PATENT DOCUMENTS

| KR | 10-2013-0006777 A | 1/2013 |
| KR | 10-2018-0027217 A | 3/2018 |
| WO | 2016144975 A2 | 9/2016 |

OTHER PUBLICATIONS

"Send and Receive an Instant Message", Microsoft, published to web on Oct. 6, 2014 at https://support.office.com/en-us/article/send-and-receive-an-instant-message-d8c9175f-1072-4270-85fc-ebfe4365c5e2, retrieved Apr. 18, 2020 (Year: 2014).*

(Continued)

*Primary Examiner* — Shourjo Dasgupta

(57) ABSTRACT

A system and method include maintaining, by a computing device, a modifiable list of one or more actions available for activation by a user of the computing device, at least some of the actions executable by at least some applications operable on the computing device. A common access interface of the computing device presents a set of one or more representations corresponding to each of the available actions. A determination is made, by the computing device, that the user has provided via the common access interface an input with respect to a particular representation corresponding to a particular available action. In response to the input, the computing device instructs a corresponding application to execute the particular available action.

20 Claims, 14 Drawing Sheets

(56) References Cited

U.S. PATENT DOCUMENTS

| | | | |
|---|---|---|---|
| 2012/0159387 A1 | 6/2012 | Oh et al. | |
| 2012/0185803 A1 | 7/2012 | Wang et al. | |
| 2012/0290965 A1* | 11/2012 | Ignor | G06F 3/04886 715/777 |
| 2012/0290972 A1 | 11/2012 | Yook et al. | |
| 2013/0067376 A1 | 3/2013 | Kim et al. | |
| 2013/0139113 A1* | 5/2013 | Choudhary | G06F 3/0488 715/847 |
| 2013/0203397 A1* | 8/2013 | Vidal | H04M 1/677 455/418 |
| 2013/0219341 A1* | 8/2013 | Lee | G06F 3/0482 715/835 |
| 2013/0311946 A1 | 11/2013 | Kwon | |
| 2014/0101617 A1* | 4/2014 | Yang | G06K 9/00288 715/846 |
| 2015/0334570 A1* | 11/2015 | Nade | G06F 3/04817 455/411 |
| 2016/0062635 A1 | 3/2016 | Feit et al. | |
| 2016/0171980 A1* | 6/2016 | Liddell | G06F 3/167 704/275 |
| 2016/0259528 A1* | 9/2016 | Foss | G06F 3/0482 |
| 2016/0364109 A1* | 12/2016 | Yim | G06F 3/0481 |
| 2017/0277396 A1* | 9/2017 | Chung | G06F 3/04817 |
| 2018/0034924 A1* | 2/2018 | Horwood | H04L 67/16 |
| 2018/0131802 A1* | 5/2018 | Cho | H04M 1/72522 |
| 2018/0336050 A1* | 11/2018 | Mukherjee | G06F 3/167 |
| 2019/0129615 A1* | 5/2019 | Sundar | G06F 3/0484 |

OTHER PUBLICATIONS

"Send & Receive Text Messages in Messages", Google, published to web on Nov. 3, 2014 at https://support.google.com/messages/answer/6080324?hl=en, retrieved Apr. 18, 2020 (Year: 2014).*

Jack Wallen, "Add Direct-Dial Shortcuts and Folders to Your Android Home Screen", posted on Dec. 16, 2010 to https://www.techrepublic.com/blog/smartphones/add-direct-dial-shortcuts-and-folders-to-your-android-home-screen/, retrieved on Jul. 8, 2020 (Year: 2010).*

Jack Wallen, "Easily Add Contact Widgets to Your Android Home Screen", posted on Jul. 14, 2014 to https://www.techrepublic.com/article/easily-add-contact-widgets-to-your-android-home-screen/, retrieved on Jul. 8, 2020 (Year: 2014).*

Steve Schwartz, "Making the Samsung Galaxy S5 Phone Your Own", published on Sep. 5, 2014 to https://www.informit.com/articles/article.aspx?p=2242815, retrieved Aug. 9, 2020 (Year: 2014).*

"Phone call application, Vega R3 ♥ ♡ play review", Feb. 28, 2013, 22 pages. https://blog.naver.com/jeelim90/100181080473.

* cited by examiner

800

801

802

EFFICIENT ACCESS TO FREQUENTLY UTILIZED ACTIONS ON COMPUTING DEVICES

CROSS-REFERENCE TO RELATED APPLICATION

The present application claims the benefit of U.S. Provisional Patent Application Ser. No. 62/672,209, filed May 16, 2018, which is incorporated herein by reference in its entirety for all purposes.

TECHNICAL FIELD

The present disclosure relates in general to computing devices and in particular to a system and method for efficient access to frequently utilized actions on computing devices.

BACKGROUND

Often times, a user has a set of actions that he or she performs frequently or on a regular basis using one or more applications (i.e., apps) on a computing device or system (e.g., smartphone, tablet, laptop, etc.). Examples of such actions can include calling "Mom" on a messaging app, sending a text message to a sibling, and transferring money to a friend via a financial app. These actions may require the user to unlock the computing device, navigate to an appropriate app, and initiate the desired action to be performed. This can be inconvenient, inefficient, time-consuming, and can reduce the overall user experience. Moreover, the bounded space of computing device screens or displays can cause further limitations or difficulties.

SUMMARY

This disclosure provides a system and method for efficient access to frequently utilized actions on computing devices.

In a first embodiment, a computer-implemented method is provided. The method includes maintaining, by a computing device, a modifiable list of one or more actions available for activation by a user of the computing device, at least some of the actions executable by at least some applications operable on the computing device. The method also includes presenting, by the computing device via a common access interface of the computing device, a set of one or more representations corresponding to each of the available actions. The method also includes determining, by the computing device, that the user has provided via the common access interface an input with respect to a particular representation corresponding to a particular available action. The method further includes in response to the input, instructing, by the computing device, a corresponding application to execute the particular available action.

In a second embodiment, a computing system is provided. The computing system includes a common access interface and a processor. The processor is operable to: maintain a modifiable list of one or more actions available for activation by a user of the system, at least some of the actions executable by at least some applications operable on the processor; present, via the common access interface of the computing device, a set of one or more representations corresponding to each of the available actions; determine that the user has provided, via the common access interface of the computing device, an input with respect to a particular representation corresponding to a particular available action; and in response to the input, instruct a corresponding application to execute the particular available action.

In a third embodiment, a non-transitory computer readable medium comprising program code is provided. The program code, when executed by a computing device, are configured to maintain a modifiable list of one or more actions available for activation by a user of the computing device, at least some of the actions executable by at least some applications operable on the processor; present, via a common access interface of the computing device, a set of one or more representations corresponding to each of the available actions; determine that the user has provided, via the common access interface of the computing device, an input with respect to a particular representation corresponding to a particular available action; and in response to the input, instruct a corresponding application to execute the particular available action.

The disclosed technology can include an efficient (e.g., quick, lightweight, convenient, etc.) approach for users to add to a "quick action" list including certain actions (such as frequently used actions) spanning one or more applications. The disclosed technology can also enable the users to manage and/or invoke such actions (i.e., quick actions) on the quick action list. The quick action list can be accessed from one or more common access interfaces or points (e.g., lock screen, home screen, home screen widget, digital assistant, etc.). By providing an ability to invoke quick actions from a common access interface or point, the disclosed technology can enable one or more actions to be initiated via a single user action without consuming a significant amount of valuable device screen real estate.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the computing device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the computing device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the computing device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing computing device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the computing device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the computing device is one or a combination of the above-listed devices. According to embodiments of the present disclosure, the computing device is a flexible computing device. The computing device disclosed herein is not limited to the above-listed devices, and can include new computing devices depending on the development of technology.

As used herein, the term "user" may denote a human or another device (e.g., an artificial intelligent computing device) using the computing device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF DRAWINGS

For a more complete understanding of the principles of the present disclosure, and the advantages thereof, reference is now made to the following descriptions taken in conjunction with the accompanying drawings, in which.

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
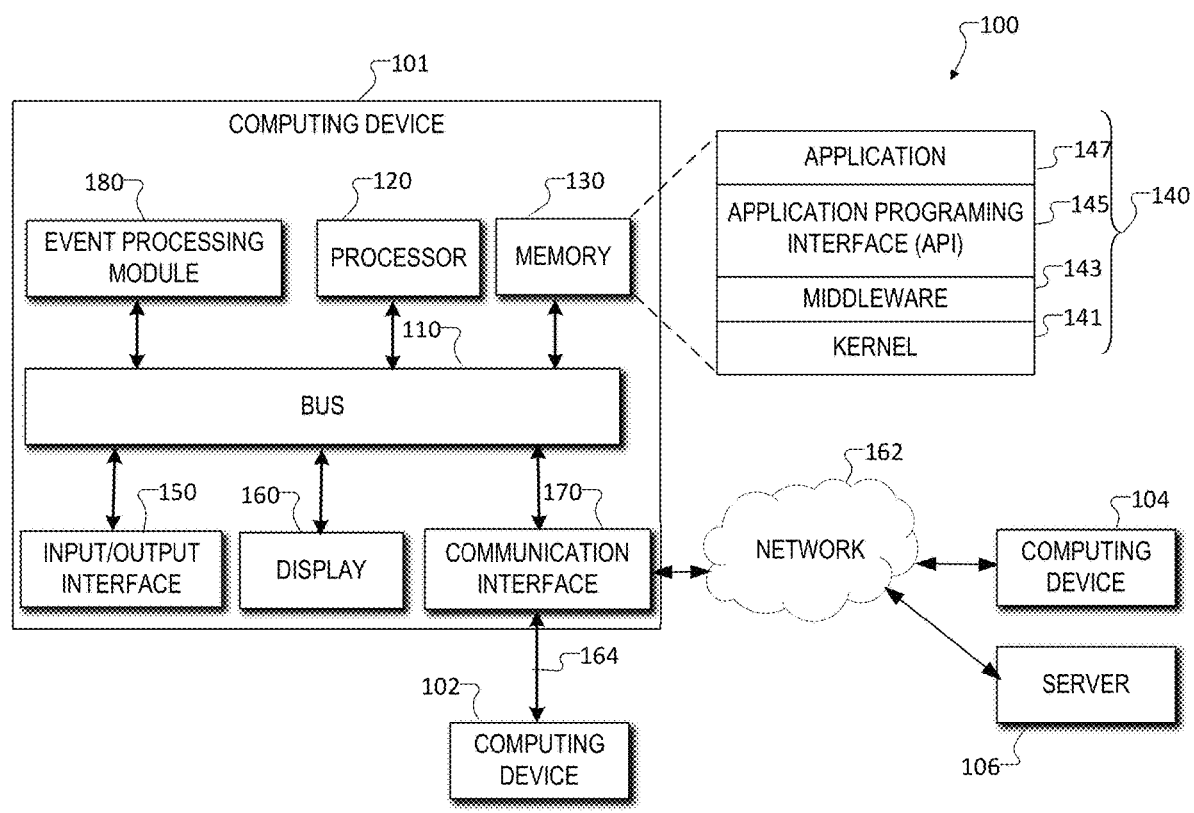
FIG. 1 is a block diagram showing selected components of an electronic computing and communications system including a computing device suitable for describing the principles of the present disclosure.

Referring to FIG. 1, according to an embodiment of the present disclosure, a computing device 101 is included in a network environment 100. The computing device 101 may include at least one of a bus 110, a processor 120, a memory 130, an input/output interface 150, a display 160, a communication interface 170, or an event processing module 180. In some embodiments, the computing device 101 may exclude at least one of the components or may add another component.

For example, examples of the computing device 101 according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the present disclosure, the computing device 101 may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the computing device 101 may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing computing device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the computing device 101 may at least one of part of a piece of furniture or building/structure, an electronic board, an electronic signature receiving device, a projector, or various measurement devices (e.g., devices for measuring water, electricity, gas, or electromagnetic waves).

According to an embodiment of the present disclosure, the computing device 101 may be one or a combination of the above-listed devices. According to an embodiment of the present disclosure, the computing device may be a flexible computing device. The computing device disclosed herein is not limited to the above-listed devices, and may include new computing devices depending on the development of technology.

As used herein, the term "user" may denote a human or another device (e.g., an artificial intelligent computing device) using the computing device 101.

Returning to FIG. 1, the bus 110 may include a circuit for connecting the components 120 to 180 with one another and transferring communications (e.g., control messages and/or data) between the components.

The processor 120 may include one or more of a central processing unit (CPU), an application processor (AP), or a communication processor (CP). The processor 120 may perform control on at least one of the other components of the computing device 101, and/or perform an operation or data processing relating to communication.

The memory 130 may include a volatile and/or non-volatile memory. For example, the memory 130 may store commands or data related to at least one other component of the computing device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the computing device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocation the priority of using the system resources of the computing device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the computing device 101. Further, the input/output interface 150 may output commands or data received from other component(s) of the computing device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the computing device 101 and an external computing device (e.g., a first computing device 102, a second computing device 104, or a server 106). For example, the communication interface 170 may be connected with the network 162 or 164 through wireless or wired communication to communicate with the external computing device.

The first external computing device 102 or the second external computing device 104 may be a wearable device or a computing device 101-mountable wearable device (e.g., a head mounted display (HMD)). When the computing device 101 is mounted in an HMD (e.g., the computing device 102), the computing device 101 may detect the mounting in the HMD and operate in a virtual reality mode. When the computing device 101 is mounted in the computing device 102 (e.g., the HMD), the computing device 101 may communicate with the computing device 102 through the communication interface 170. The computing device 101 may be directly connected with the computing device 102 to communicate with the computing device 102 without involving with a separate network.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

The network 162 may include at least one of communication networks, e.g., a computer network (e.g., local area network (LAN) or wide area network (WAN)), Internet, or a telephone network.

The first and second external computing devices 102 and 104 each may be a device of the same or a different type from the computing device 101. According to an embodiment of the present disclosure, the server 106 may include a group of one or more servers. According to an embodiment of the present disclosure, all or some of operations executed on the computing device 101 may be executed on another or multiple other computing devices (e.g., the computing devices 102 and 104 or server 106). According to an embodiment of the present disclosure, when the computing device 101 should perform some function or service automatically or at a request, the computing device 101, instead of executing the function or service on its own or additionally, may request another device (e.g., computing devices 102 and 104 or server 106) to perform at least some functions associated therewith. The other computing device (e.g., computing devices 102 and 104 or server 106) may execute the requested functions or additional functions and transfer a result of the execution to the computing device 101. The computing device 101 may provide a requested function or service by processing the received result as it is or additionally. To that end, a cloud computing, distributed computing, or client-server computing technique may be used, for example.

Although FIG. 1 shows that the computing device 101 includes the communication interface 170 to communicate with the external computing device 104 or 106 via the network 162, the computing device 101 may be independently operated without a separate communication function, according to an embodiment of the present disclosure.

The server 106 may support to drive the computing device 101 by performing at least one of operations (or functions) implemented on the computing device 101. For example, the server 106 may include an event processing server module (not shown) that may support the event processing module 180 implemented in the computing device 101.

For example, the event processing server module may include at least one of the components of the event processing module 180 and perform (or instead perform) at least one of the operations (or functions) conducted by the event processing module 180.

The event processing module 180 may process at least part of information obtained from other elements (e.g., the processor 120, the memory 130, the input/output interface 150, or the communication interface 170) and may provide the same to the user in various manners. For example, according to an embodiment of the present disclosure, the event processing module 180 may process information related to an event, which is generated while the computing device 101 is mounted in a wearable device (e.g., the computing device 102) to function as a display apparatus and to operate in the virtual reality mode, to fit the virtual reality mode and display the processed information. When the event generated while operating in the virtual reality mode is an event related to running an application, the event processing module 180 may block the running of the application or process the application to operate as a background application or process.

Although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of the present disclosure in interoperation with at least one program 140 stored in the memory 130.

Exemplary embodiments described herein are not meant to be limiting and merely illustrative of various aspects of the disclosure. While exemplary embodiments may be indicated as applicable to a particular device category (e.g., TVs, etc.) the processes and examples provided are not intended to be solely limited to the device category and can be broadly applicable to various device categories (e.g., appliances, computers, automobiles, etc.)

In one embodiment, as part of a setup process, a user may be presented with applications or services on a connected device (e.g., mobile device, smartphone, tablet, laptop, desktop, or similar device), wherein the applications or services may be installed on the device being setup. In one example, the applications (or services) may be supported by effortless login (also referred to herein as silent login). When an application is selected on the connected device, the process may deep link to the mobile application installed on the connected device or launch a secure web browser to authenticate the user. Upon successful authentication, a token may be delivered to the connected device allowing the connected device to login without having to enter authentication information.

Some conventional operating systems (OS's) utilize touch interaction from a user to display a preview of actions for individual apps. Under such conventional approaches, when long-pressing (or hard-pressing, force-touching, etc.) an app icon, a list of application-chosen actions for that particular app is displayed to the user. However, there are limitations with such conventional approaches, which include (but are not limited to): (1) Each app provides its own list of actions, but there is no cumulative list associated with multiple applications; (2) There is no mechanism for users to customize the actions available for an app; and (3) Users can access actions only when they navigate to a launcher screen or interface where the app shortcut exists.

Moreover, some approaches (in the form of lock screen apps) allow users to select and navigate to an app directly from the lock screen when unlocking the device. Examples include apps that allow users to customize the list of apps that they can launch from the lock screen and apps that track frequently used apps and automatically populate app shortcuts in the lock screen.

While these approaches provide quick access to a small set of apps, users still have to navigate to the desired action upon opening the app.

Figure 2A:
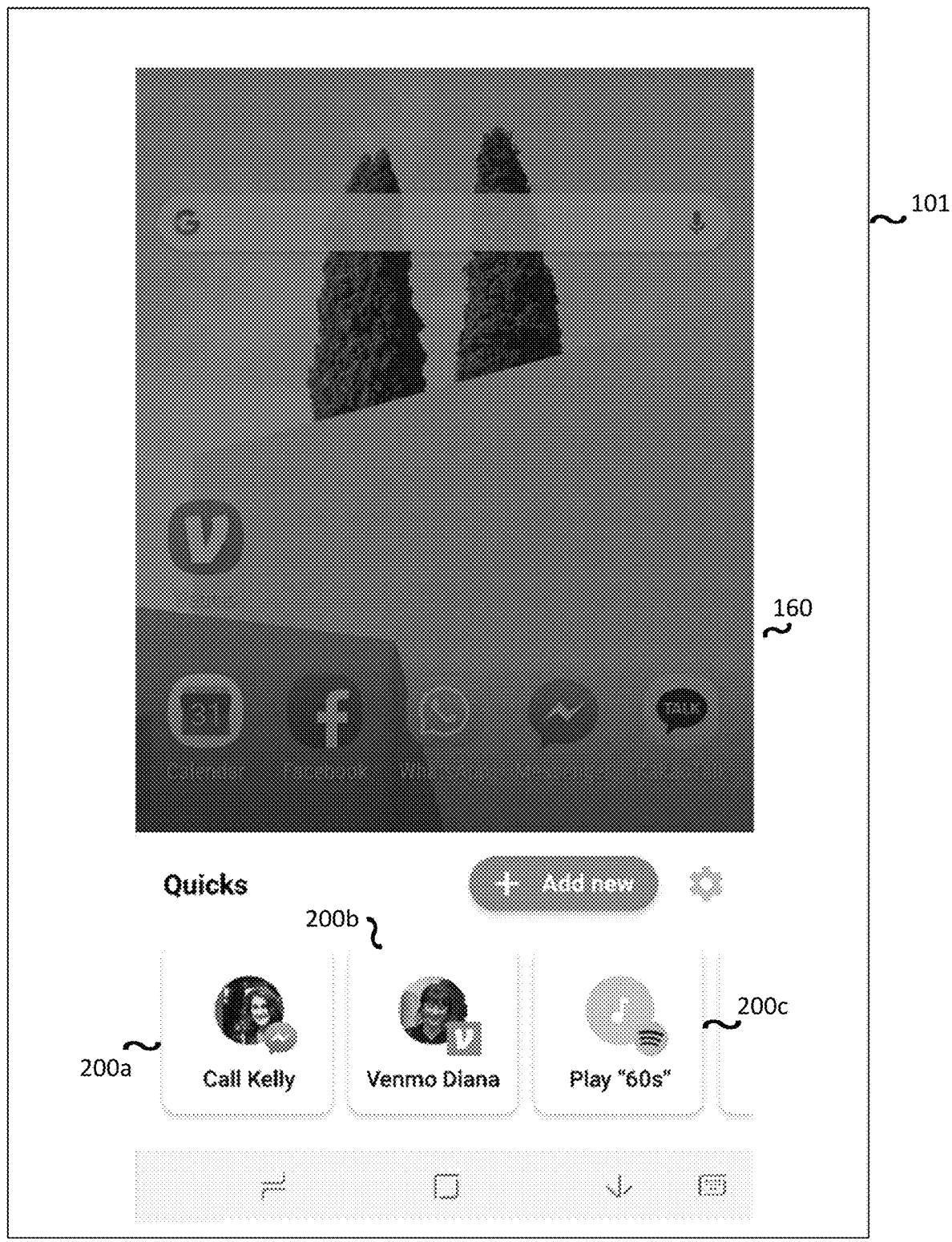
FIGS. 2A-2B are diagrams of exemplary presentations on the display of the computing device of FIG. 1, which include quick action access interfaces for implementing a quick action system according to one representative embodiment of the inventive principles.
Figure 2B:
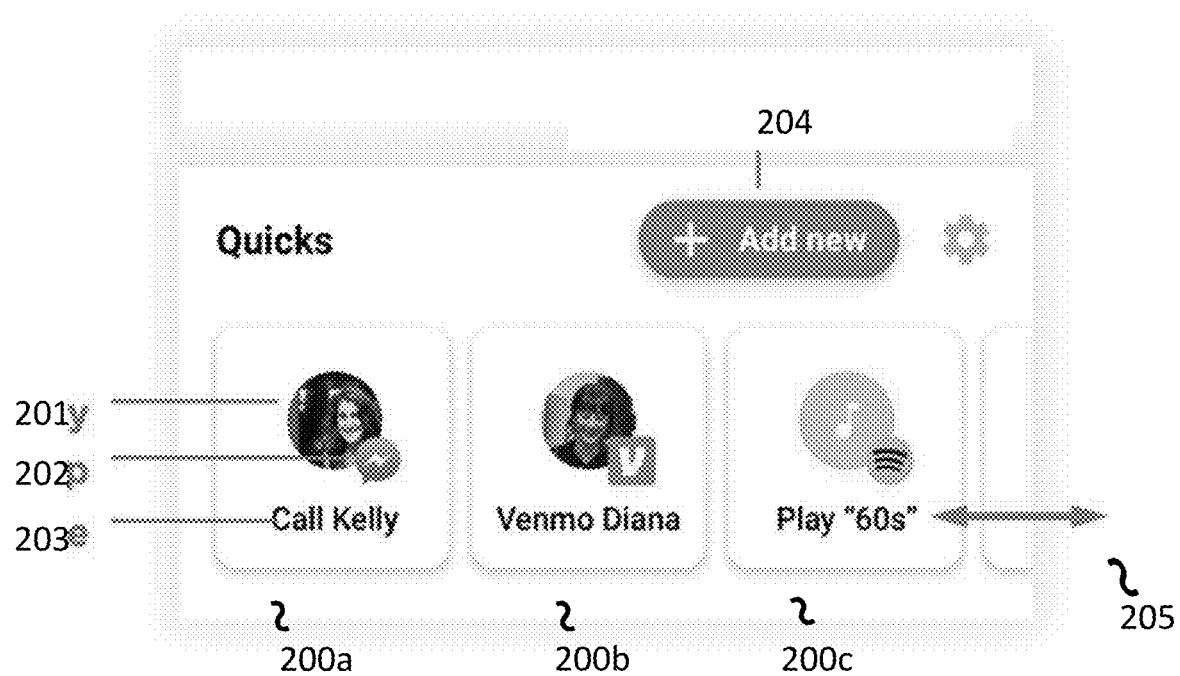

The embodiments of the inventive principles go beyond conventional technologies. As shown in FIGS. 2A and 2B, one embodiment of these principles includes a UI including a set of buttons or "quicks" 200 that allow the user to easily access and launch multiple applications from a single presentation on display screen (i.e., "quick actions"). In this embodiment, three quicks 200a-200c are shown for reference, although additional quicks may be accessed by scrolling or a similar operation, as shown in FIG. 2B by arrow 205. As discussed further below, some or all of quicks 200 may be accessed through a common access interface or point.

In this example, each quick 200 includes a representation 201 of the entity being accessed, a representation 202 of the app implementing the desired operation, and a representation 203 of the operation to be performed. In the example of quick 200a, the entity representation 201 is a picture of Kelly, the app representation 202 is a mobile phone app, and the action representation 203 is "call Kelly." For quick 200b, the entity representation 201 is a picture of Diana, the app representation 202 is Venmo, and the operation representation 203 is "Venmo Diana." In the case of quick 200c, the entity representation 201 is a graphic for music, the app representation 202 is a symbol for a music app, and the representation for the operation is "play 60s." (It should be recognized that the appearance and content of quicks 200 may vary widely between embodiments and that entity representations 201, app representations 202, and operation representations 203 are examples only.)

Advantageously, quicks 200 allow a user of computing device 101 to initiate an action, or set of actions, with a single user interaction, such as touching and/or passing over the corresponding point on display 160. Also as shown in FIG. 2A, and as discussed further below, a user can also use an access point or button 204 on display screen 160 to add new quicks 200 to the list of available quicks.

In some cases, quicks 200 are used to implement a set of actions that the user performs frequently/commonly or on a regular basis using one or more of the various applications available on computing device 101. Examples of such actions can include (but are not limited to): audio or video calling Kelly (e.g., using quick 200a) sending a text message to a sibling via a messaging app, transferring money to a friend via a financial app (e.g., using quick 200b), launching a music playlist (e.g., using quick 200c), and so on. As discussed further below, initiating a set of actions using one or more quicks 200 also allows the user to unlock computing device 101 using a minimum number of user actions, interactions, or inputs.

The various embodiments of the inventive principles provide various approaches for identifying candidate actions to be added to a quick action list (i.e., a set of actions each of which may be accessed through a corresponding quick 200). In one exemplary approach, shown in the flow chart of FIG. 3, an app registers with the quick action system (Block 300). The app generates a user interface (Block 301) and receives user selections and inputs (Block 302). From these user selections and inputs the app identifies frequently or periodically used actions (Block 303).

Based on the identified frequent and/or periodic actions, the app sends quick action parameters (e.g., operation characteristics, operation variables, operation descriptors, and the like) to the quick action system to specify the Quick Action (Block 304). The information sent to the quick action system may include the entity (e.g., Kelly of quick 200*a*), the app invoked to implement the operation (e.g., the phone/video calling app of quick 200*a*), and the corresponding action (e.g., the action of calling Kelly as associated with quick 200*a*). Prior to adding a corresponding quick 200 to the quick action list, the user may be provided with a suggestion or option to make the addition (Block 305).

Figure 3:
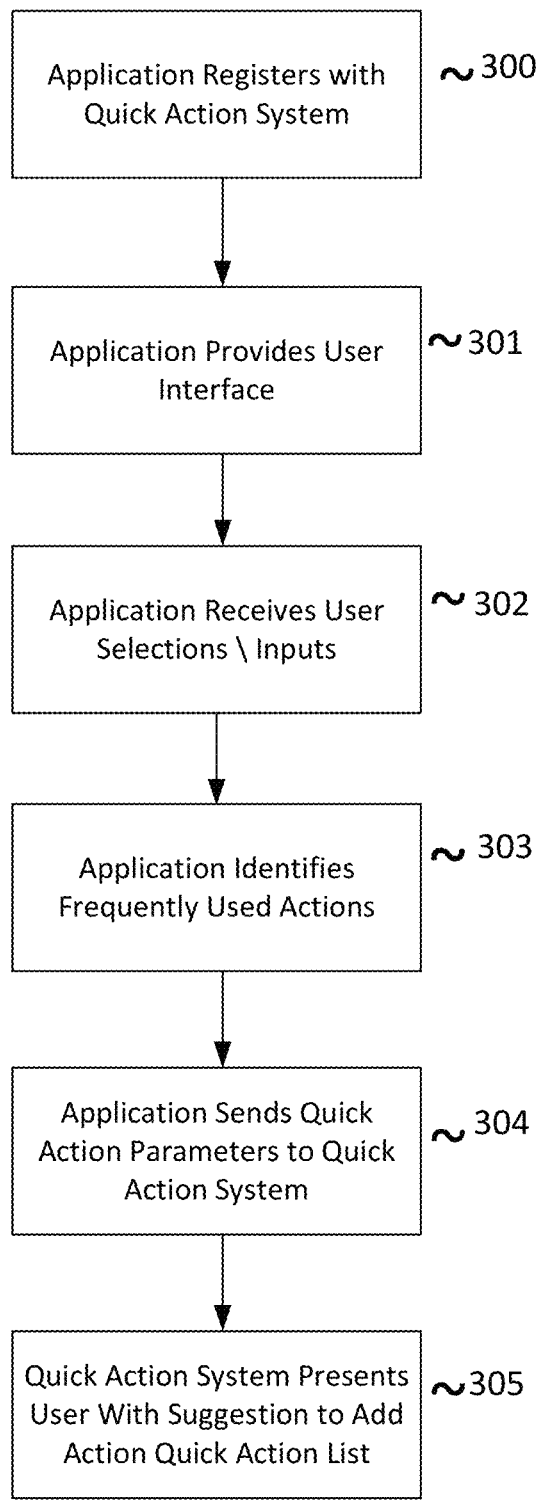
FIG. 3 is a flow chart of an exemplary procedure in which applications on the computing device of FIG. 1 indicate what actions are available for use in the quick action system.

For the approach shown in FIG. 3, application programming interfaces (APIs) may be provided for app developers to communicate with the quick action system. In this approach, each individual app can be responsible for providing a UI to add a quick action. In a different approach, the quick action system (e.g., implementable within an operating system or a separate application) of the present disclosure can provide a UI to add a quick action.

Figure 4:
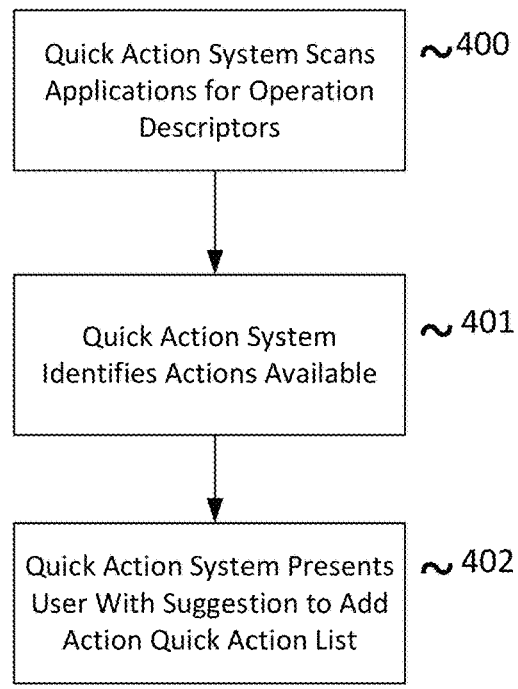
FIG. 4 is a flow chart of an exemplary procedure in which the quick action system scans applications on the computing device of FIG. 1 to determine what actions are available for use in the quick action system.

Another approach to identifying actions available for addition to the quick action list is shown in the flow chart of FIG. 4. In this exemplary embodiment, the quick action system scans the applications on computing device 101 for operation descriptors (e.g., information and parameters that indicate the operations/functions provided by the given app) (Block 400). From the operation descriptors, the quick action system identifies the actions available (Block 401). Prior to adding a corresponding quick 200 to the quick action list, the user may be provided with a suggestion or option to make the addition (Block 402).

Figure 5:
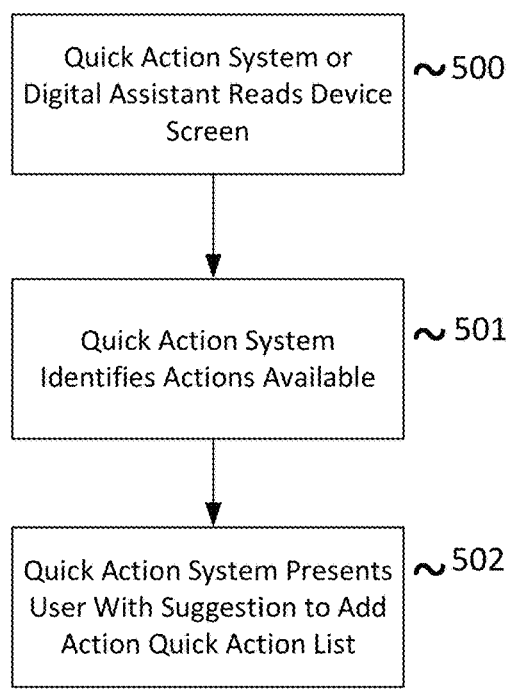
FIG. 5 is a flow chart of an exemplary procedure in which the quick action system or a digital assistant reads the display screen of the computing device of FIG. 1 to determine what actions are available for use in the quick action system.

A further approach to identifying available actions for addition to the quick action list is shown in the flow chart of FIG. 5. In the embodiment of FIG. 5, the quick action system or a digital assistant reads the screen of display 160 of computing device 101 (Block 500). At Block 501, the quick action system identifies the actions available from reading the device display. Prior to adding a corresponding quick 200 to the quick action list, the user may be provided with a suggestion or option to make the addition (Block 502).

Figure 6:
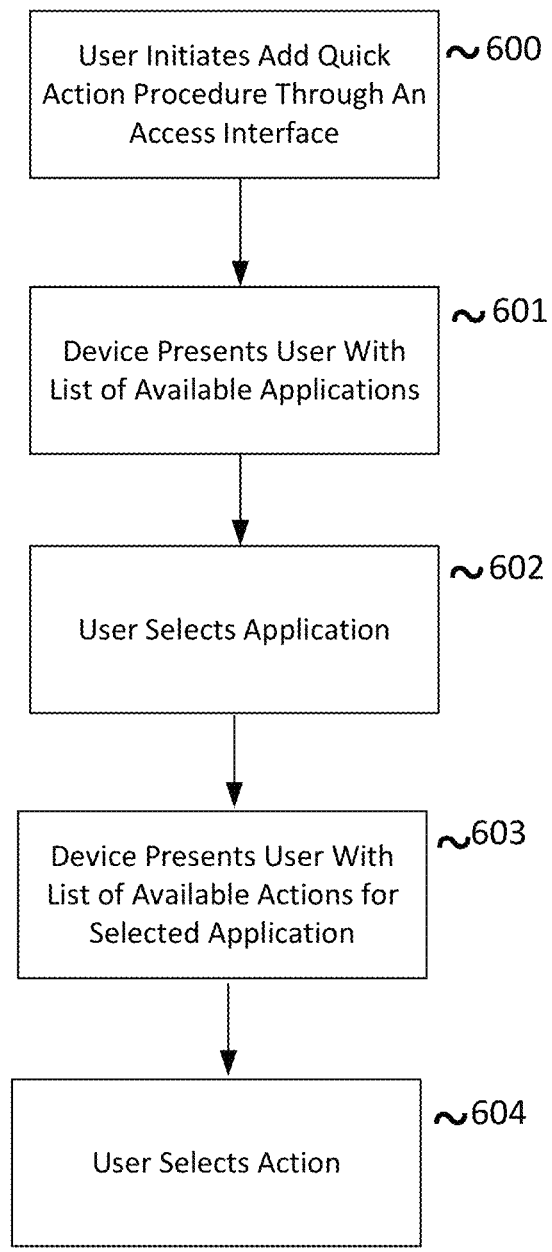
FIG. 6 is a flow chart of a representative user-initiated procedure for adding quick actions to the quick action system.
Figure 7A:
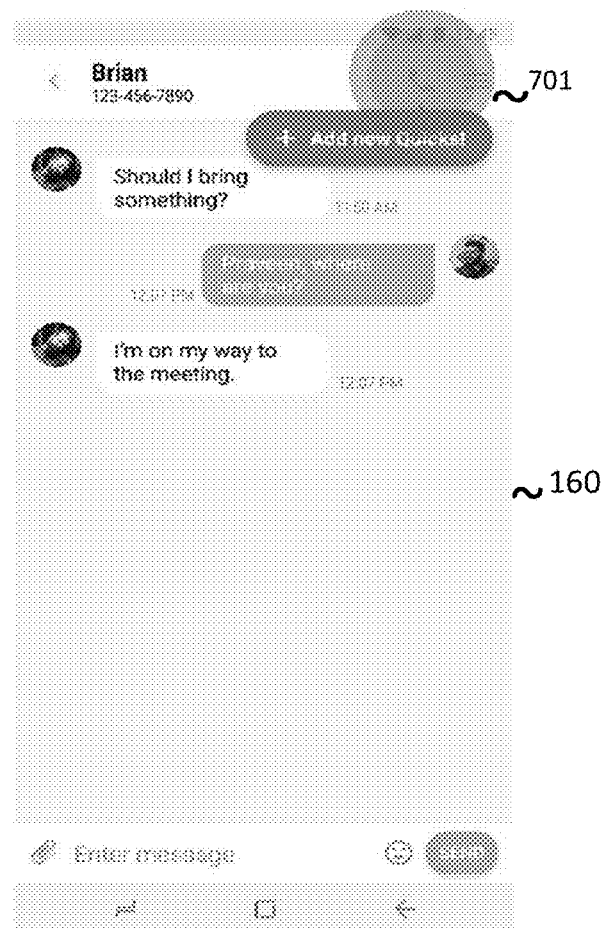
FIGS. 7A-7B are diagrams of exemplary user interfaces on the display screen of the computing device of FIG. 1 for allowing the user to initiate the addition of a quick action to the quick action system using a long-press action on the display screen and the home button, respectively.
Figure 7B:
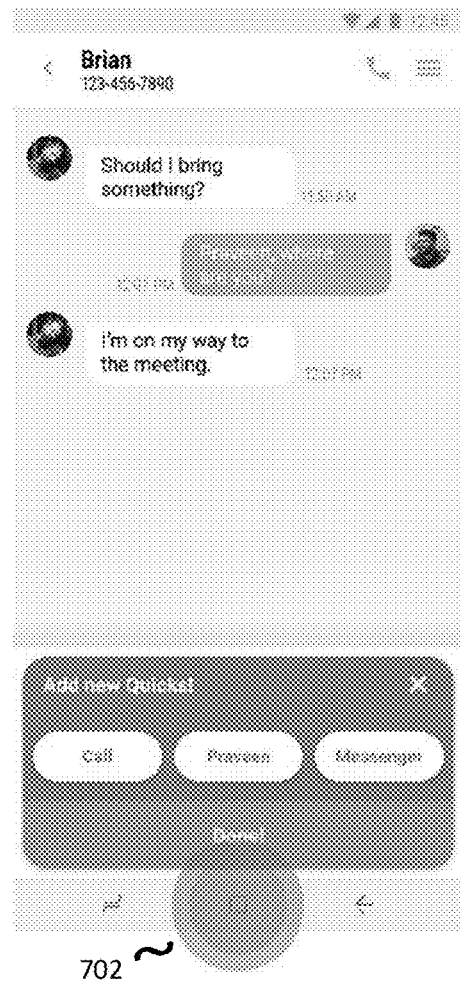

The user may also add a quick 200 by initiating a procedure, such as the exemplary procedure shown in FIG. 6. The user initiates the procedure (Block 600), for example, using user interface ("add new") 204 of FIG. 2B, which may be invoked by long-pressing on a point or an interactive icon 701 on the screen of display 160, as shown in FIG. 7A or by depressing the home button 702, as shown in FIG. 7B. In the examples of FIGS. 7A and 7B, a quick action is being created while an app is running in the background, although apps may be created under other operating conditions, such as when the home screen is being displayed on the screen of display 160 and/or when no apps are running. At Block 601, the user is presented, on the screen of display 160, with a list of available applications for selection. The user selects the desired app at Block 602.

Figure 8A:
FIGS. 8A, 8b, and 8C are diagrams of an exemplary user interface on the display screen of the computing device of FIG. 1 for allowing a user to add a quick action to the quick action system.
Figure 8B:
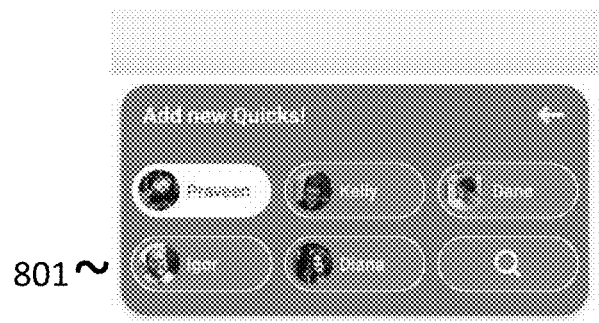

The user is next presented with an option to select the action to be taken and the target entity (e.g., the recipient of a call or text), if any (Block 603). An example of a UI 800 for selecting an action to be executed by an application is shown in FIG. 8A, although a wide range of other interfaces are possible. In the example of FIG. 8A, the user has chosen to "text" (or message, chat with, etc.) another user. An example of a UI 801 for selecting a telecommunications quick action and target are shown in FIG. 8B, although the content and appearance may change in alternate embodiments. In the example of FIG. 8B, the user has selected "Praveen". At Block 604, the user selects the action.

Figure 8C:
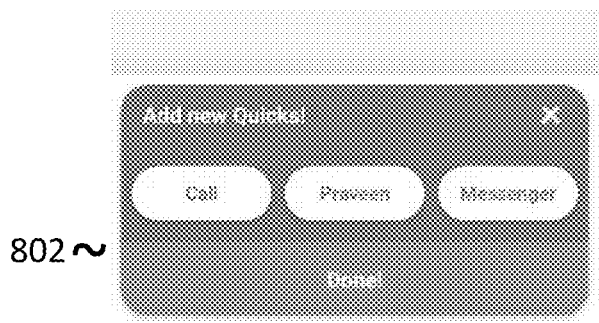

After the user makes the selection, the user may be provided with the opportunity to check and save the newly created quick action before adding it onto the quick action list. An exemplary UI 802 for checking and saving the new telecommunications quick action and adding it to the quick action list is shown in FIG. 8C, although other UIs, differing in content and appearance, are possible.

Once the quick action list is created, the inventive principles provide for multiple ways for invoking a given quick action. An exemplary procedure for initiating an action is shown in the flowchart of FIG. 9 and exemplary common access interface or points for initiating quick actions through the screen of display 160 are shown in FIGS. 10A-10E.

Figure 9:
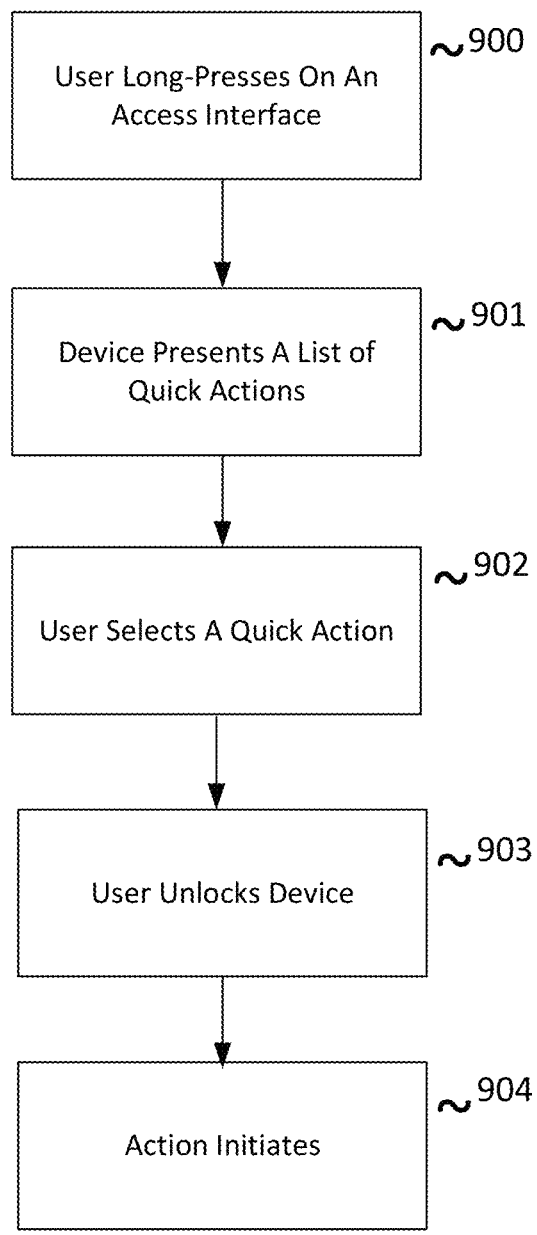
FIG. 9 is a flow chart of a representative procedure for allowing a user to add a quick action to the quick action system when the computing device of FIG. 1 is locked.
Figure 10A:
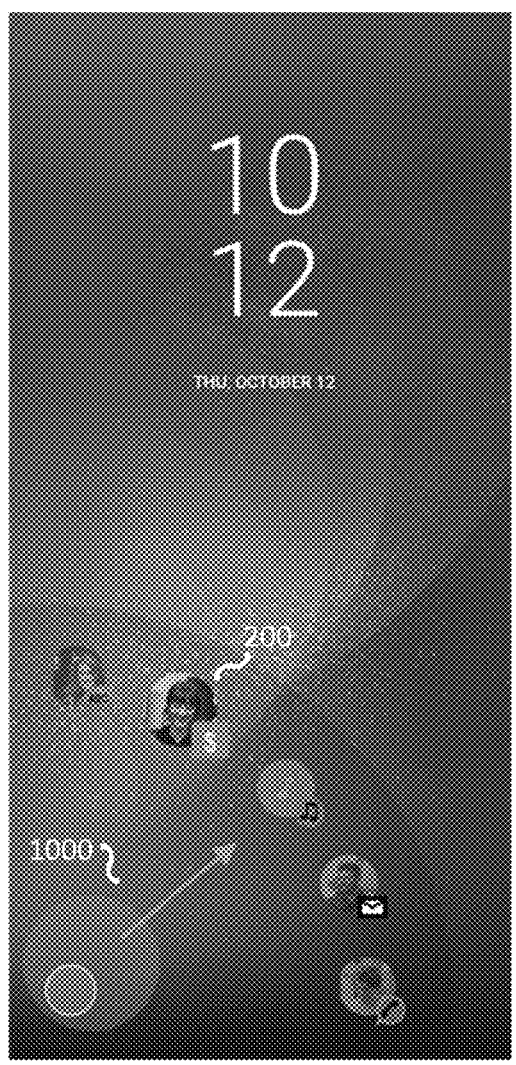
FIGS. 10A, 10B, 10C, 10D, and 10E are diagrams of exemplary access interfaces for initiating quick actions through the display screen of the computing device of FIG. 1.
Figure 10B:
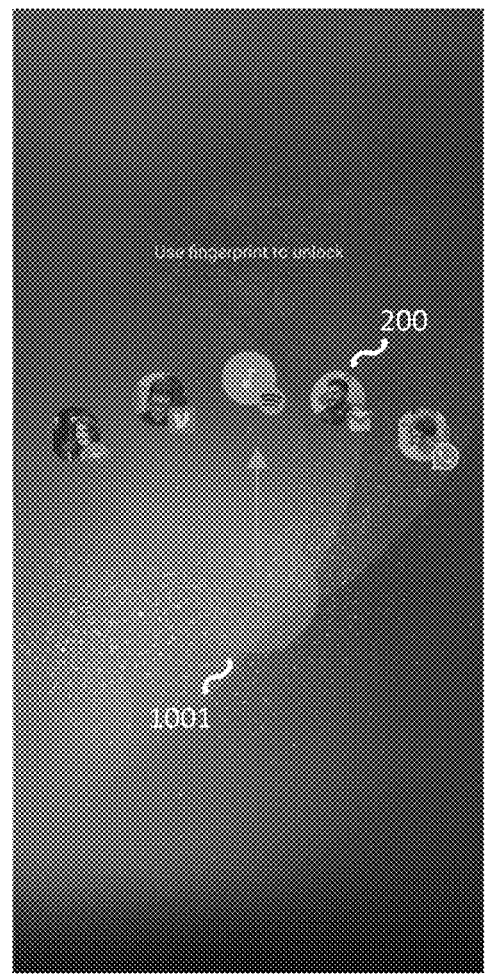
Figure 10C:
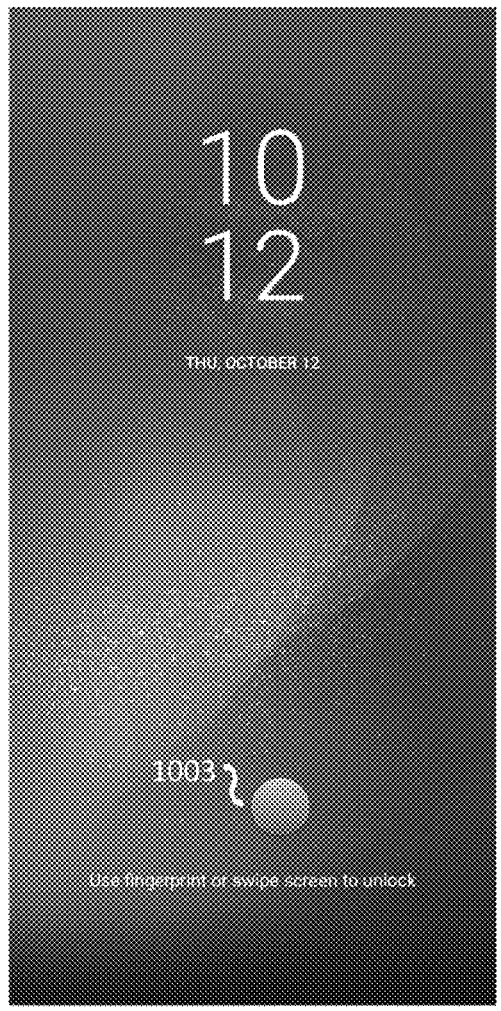
Figure 10D:
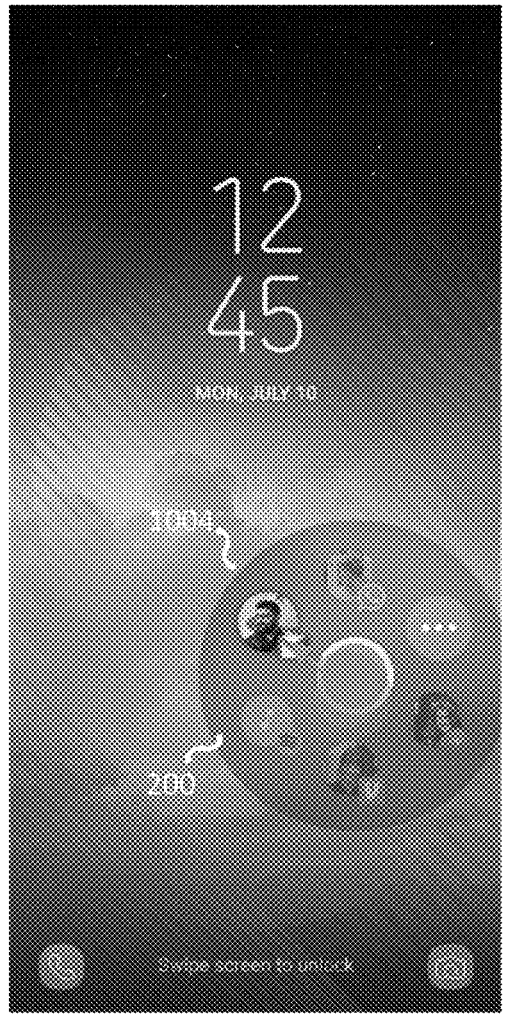
Figure 10E:
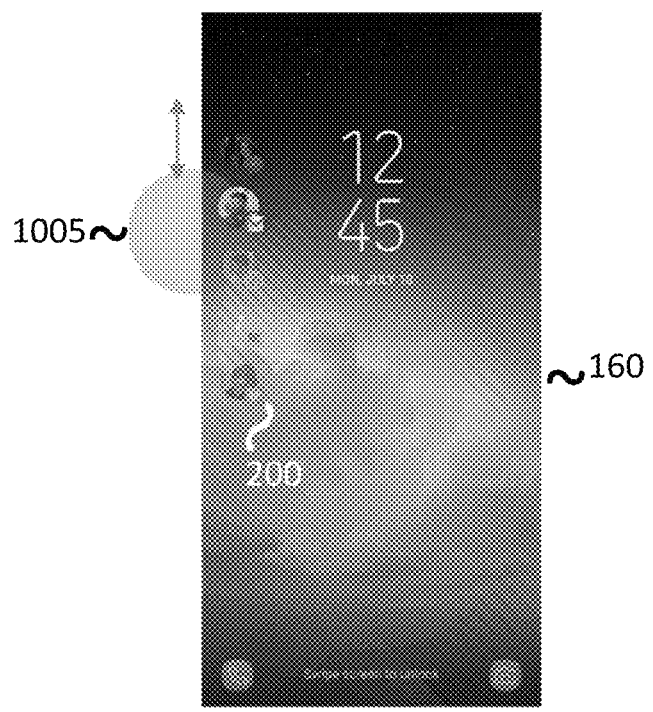

At Block 900 of FIG. 9, the user long-presses on a common access interface, after which the user is presented a list of available quick actions (Block 901). A user selects a quick action (Block 902) to initiate an action, or set of actions, with a single user interaction, such as touching and/or passing over the corresponding point on display 160. Initiating a set of actions using one or more quicks 200 also allows the user to unlock computing device 101 using a minimum number of user actions, interactions, or inputs (Block 903). The action corresponding to the quick action selected initiates (Block 904). Based on the identified frequent and/or periodic actions, the app sends quick action parameters (e.g., operation characteristics, operation variables, operation descriptors, and the like) to the quick action system to specify the Quick Action. The information sent to the quick action system may include the entity (e.g., Kelly of quick 200*a*), the app invoked to implement the operation (e.g., the phone/video calling app of quick 200*a*), and the corresponding action (e.g., the action of calling Kelly as associated with quick 200*a*). Prior to adding a corresponding quick 200 to the quick action list, the user may be provided with a suggestion or option to make the addition. In FIG. 10A, an icon 1000 can be moved or slid, such as based on user interaction (e.g., touch input), diagonally on the screen of display 160 and at least some of the quicks 200 are presented to the user. In the example of FIG. 10B, the user swipes an area 1001 anywhere on the lock screen on display 160 and at least some of the quick actions 200 on the quick action list appear. FIG. 10C illustrates an embodiment in which an icon or soft button 1003 is triggered to appear after the user touches the screen on the lock screen, which also may provide positioning for concurrent finger print scanning. In FIG. 10D, the user long-presses in an area anywhere on the lock screen and the quick actions 200 appear 1004. Moreover, in some embodiments, the user can slide or move his/her fingertip along the (touch) screen and let go at a particular quick action to execute that particular quick action. Finally, in the embodiment of FIG. 10E, the user presses a physical button 1005, for example a physical button on the side of computing device 101 to bring up at least some of the quicks 200 from the quick list.

In some cases, the user may unlock the computing device before or after engaging with the common access interface or point. For example, computing device 101 may read the user's fingerprint concurrent with the touching of the common access interface or point or desired quick 200 (e.g., as shown in FIG. 10B). Alternatively, the user may touch the common access interface or point and the desired quick 200, and then provide a fingerprint or enter a passcode to unlock computing device 101, after which the quick action launches. In another embodiment, the user touches the common access interface or point and desired quick 200, swipes the screen of display 160, and then inputs his/her fingerprint or passcode before the quick action launches.

Figure 11:
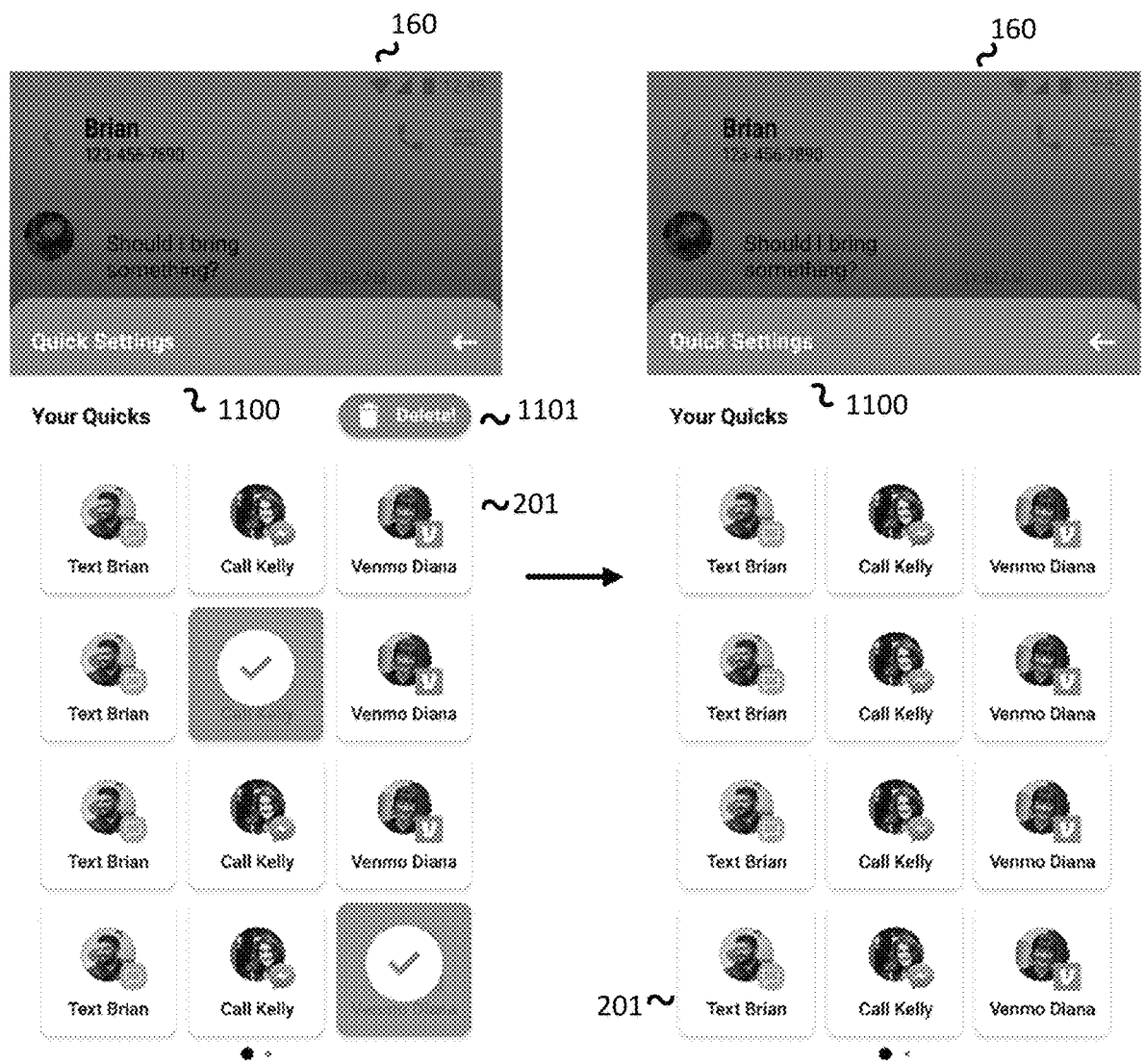
FIG. 11 is a diagram demonstrating the ability of a user to add, modify, and delete quick actions through a user interface on the display screen of the computing device of FIG. 1.

FIG. 11 depicts an exemplary UI for allowing the user to add quick actions, edit existing quick actions, set the order of quick actions, delete quick actions, and/or otherwise modify quick actions. (FIG. 11 is illustrative; in alternate embodiments the appearance and content of the UI may vary significantly.) In this embodiment, a quick settings tab 1100 allows the user to make changes to the quick action list. For example, from the quick setting tab, the user may call up a UI such as shown in FIGS. 8A-8C and change the target entity, the app being invoked, and/or the desired action. A delete button 1101 allows the user to delete a quick 200 in its entirety. In one instance, by long-pressing on one or more quicks 200 and dragging from one display location to another, the arrangement of the quicks 200 when they appear on the display screen may be modified.

Figure 12:
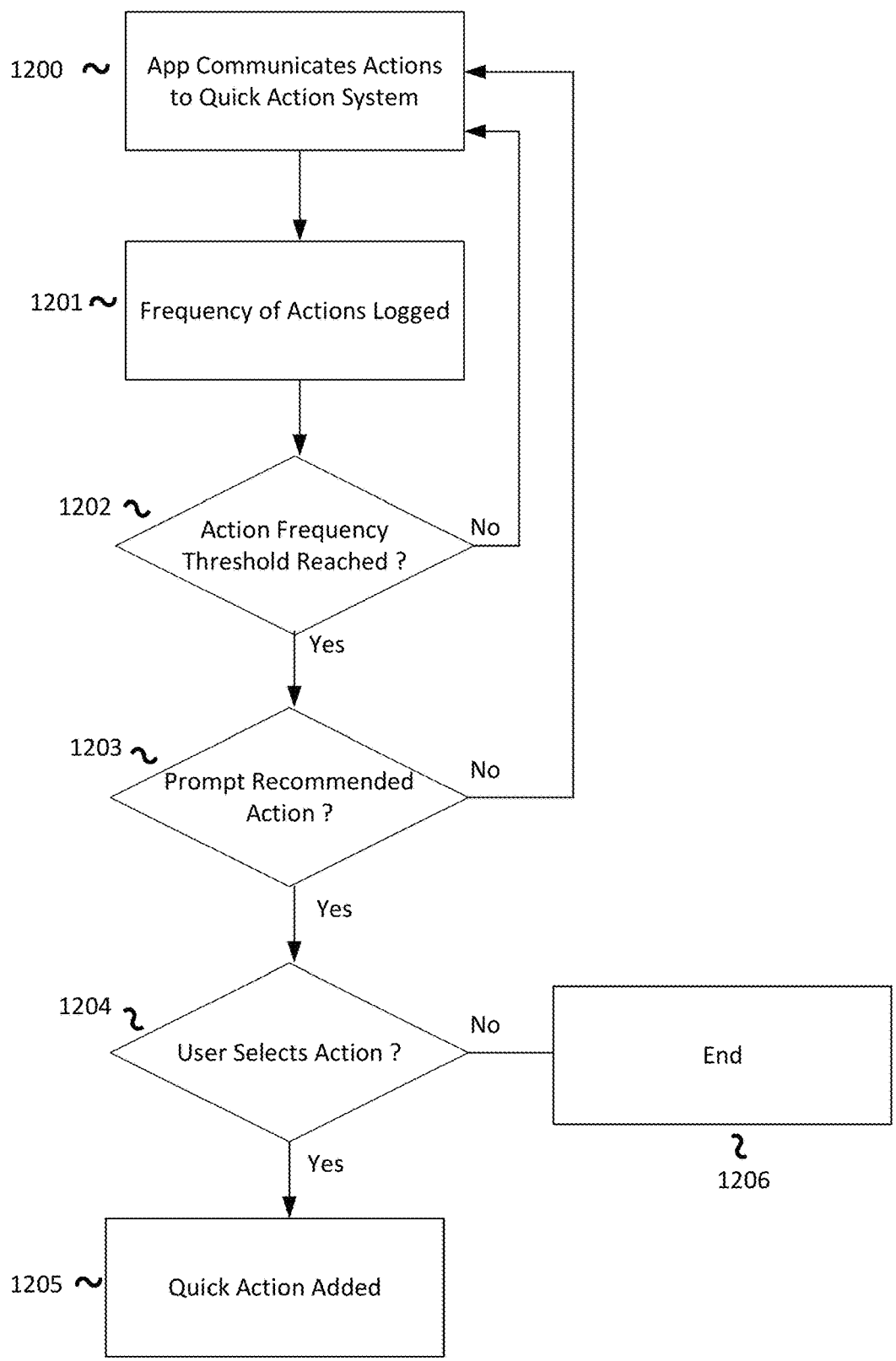
FIG. 12 is a flow chart of a representative procedure in which the quick action system provides suggestions to the user to add frequently used actions to the quick action system.

FIG. 12 illustrates a further embodiment of the inventive principles in which the quick action systems identifies frequently used actions and either automatically adds those actions to the quick action list or makes a suggestion to do so.

At Block 1200, a given app running on computing device 101 communicates actions executed by that app to the quick action system. The quick action system logs the frequency of each of those actions (Block 1201). In some embodiments, once a preselected frequency threshold has been reached for a given action (Block 1202), the user is prompted (Block 1203) with a suggestion to create a new quick 200. The user either selects to create the new quick action to be added to the quick action list (Blocks 1204 and 1205) or declines to create the quick action (Block 1204 and 1205).

In alternate embodiments, the user may select to have frequently used actions automatically added to the quick action list once the frequency threshold is reached. The user may select or input the appropriate setting(s)/configuration(s) through quick action tab 1100 of FIG. 11 or a similar interface. Once the action has been added to the quick action list, the user can customize the quick 200, as needed.

It should be noted that the illustrated regions of the figures are merely examples. Also, it should be noted that although the above illustrations are shown in two dimensions, the depicted structures are often three dimensional. It also should be noted that for clarity and ease of illustration, the figures are not necessarily made to scale.

While the above detailed diagrams have shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure.

It is therefore contemplated that the claims will cover any such modifications or embodiments that fall within the true scope of the disclosure.

What is claimed is:

1. A computer-implemented method comprising:
creating, by a computing device, a quick action based on input from a user of the computing device, wherein creating the quick action comprises:
presenting, by the computing device, a list of one or more available applications for selection by the user;
receiving, by the computing device, from the user, a selection of a first application out of the list of one or more available applications;
presenting, by the computing device, a list of one or more available entities for selection by the user;
receiving, by the computing device, from the user, a selection of a target entity out of the list of one or more available entities;
presenting, by the computing device, a first set of actions executable by the first application related to the target entity, the first set of actions including a first action; and
receiving, by the computing device, from the user, a selection of the first action out of the first set;
maintaining, by the computing device, a modifiable list of one or more quick actions available for activation by the user of the computing device, wherein the modifiable list of one or more quick actions includes the quick action, wherein the modifiable list enables modification of the first action and target entity in the quick action, and wherein at least some of the quick actions are executable by at least some applications operable on the computing device;
presenting, by the computing device via a common access interface of the computing device, a set of one or more representations corresponding to each of the one or more quick actions;
determining, by the computing device, that the user has provided, via the common access interface, an input with respect to a particular representation corresponding to the quick action; and
in response to the input, instructing, by the computing device, the first application to execute the first action towards the target entity.

2. The method of claim 1, further comprising:
modifying the modifiable list of one or more actions in response to at least one of information input by the user or information generated from at least one application operable on the computing device.

3. The method of claim 1, further comprising:
identifying one or more operation descriptors associated with applications operable on the computing device; and
selectively adding at least one action to the modifiable list of one or more actions based on the one or more operation descriptors.

4. The method of claim 1, further comprising:
receiving, from an application operable on the computing device, information about a frequency of use of an action yet to be included in the modifiable list of one or more actions; and
generating a suggestion for adding the action to the modifiable list of one or more actions.

5. The method of claim 1, wherein the common access interface comprises at least one of a lock screen, a home screen, a physical button, or a digital assistant.

6. The method of claim 1, wherein a representation corresponding to an available action comprises a graphical icon presented on a display of the computing device.

7. The method of claim 1, wherein a representation corresponding to an available action comprises an audible prompt.

8. The method of claim 1, further comprising:
analyzing content on a display of the computing device; and
in response to analyzing the content, generating a suggestion for adding an action to the modifiable list of one or more actions.

9. The method of claim 8, wherein the computing device comprises a digital assistant configured to analyze the content on the display of the computing device and in response generate the suggestion for adding the action to the modifiable list of one or more actions.

10. The method of claim 1, wherein the common access interface comprises an audio interface configured to perform at least one of receive audio input or provide audio output.

11. A computing system comprising:
a common access interface; and
a processor operable to:
create, by a computing system, a quick action based on input from a user of the computing system, wherein creating the quick action comprises:
presenting, by the computing system, a list of one or more available applications for selection by the user;
receiving, by the computing system, from the user, a selection of a first application out of the list of one or more available applications;
presenting, by the computing system, a list of one or more available entities for selection by the user;
receiving, by the computing system, from the user, a selection of a target entity out of the list of one or more available entities;
presenting, by the computing system, a first set of actions executable by the first application related to the target entity, the first set of actions including a first action; and
receiving, by the computing system, from the user, a selection of the first action out of the first set;
maintain a modifiable list of one or more quick actions available for activation by a user of the computing system, wherein the modifiable list of one or more quick actions includes the quick action, wherein the modifiable list enables modification of the first action and target entity in the quick action, and wherein at least some of the quick actions are executable by at least some applications operable on the processor,
present, via the common access interface of the computing system, a set of one or more representations corresponding to each of the one or more quick actions,
determine that the user has provided, via the common access interface of the computing system, an input with respect to a particular representation corresponding to the quick action, and
in response to the input, instruct the first application to execute the first action towards the target entity.

12. The computing system of claim 11, wherein the processor is further operable to:
identify one or more operation descriptors associated with applications operable on the processor; and
generate at least one action based on the one or more operation descriptors.

13. The computing system of claim 12, wherein the processor is further operable to:
receive, from an application operable on the processor, information about a frequency of use of an action yet to be included in the modifiable list of one or more actions; and
selectively add at least one action to the modifiable list of one or more actions based on the one or more operation descriptors.

14. The computing system of claim 11, wherein the common access interface comprises at least one of a lock screen, a home screen, a physical button, or a digital assistant.

15. The computing system of claim 11, wherein the computing system further comprises a display and the processor is further operable to:
analyze content on a display of the computing system; and
in response to analyzing the content, generate a suggestion for adding an action to the modifiable list of one or more actions.

16. A non-transitory computer-readable medium comprising program code, which when executed by a processor, causes a computing device to:
create a quick action based on input from a user of the computing device, wherein creating the quick action comprises:
presenting a list of one or more available applications for selection by the user;
receiving from the user, a selection of a first application out of the list of one or more available applications;
presenting a list of one or more available entities for selection by the user;
receiving from the user, a selection of a target entity out of the list of one or more available entities;
presenting a first set of actions executable by the first application related to the target entity, the first set of actions including a first action; and
receiving from the user, a selection of the first action out of the first set;
maintain a modifiable list of one or more quick actions available for activation by a user of the computing device, wherein the modifiable list of one or more quick actions includes the quick action, wherein the modifiable list enables modification of the first action and target entity in the quick action, and wherein at least some of the quick actions are executable by at least some applications operable on the processor;
present, via a common access interface of the computing device, a set of one or more representations corresponding to each of the one or more quick actions;
determine that the user has provided, via the common access interface of the computing device, an input with respect to a particular representation corresponding to the quick action; and
in response to the input, instruct the first application to execute the first action towards the target entity.

17. The non-transitory computer-readable medium of claim 16, wherein the program code, which when executed by the processor, further causes the computing device to:
identify one or more operation descriptors associated with applications operable on the processor; and
selectively adding at least one action to the modifiable list of one or more actions based on the one or more operation descriptors.

18. The non-transitory computer-readable medium of claim 16, wherein the program code, which when executed by the processor, further causes the computing device to:
receive, from an application operable on the processor, information about a frequency of use of an action yet to be included in the modifiable list of one or more actions; and
generate a suggestion for adding the action to the modifiable list of one or more actions.

19. The non-transitory computer-readable medium of claim 16, wherein the program code, which when executed by the processor, further causes the computing device to:
present, via a common access interface of the computing device including at least one of a lock screen, a home screen, a physical button, or a digital assistant, the set of one or more representations each corresponding to each of the available actions.

20. The non-transitory computer-readable medium of claim 16, wherein the program code, which when executed by the processor, further causes the computing device to:
   analyze content on a display of the computing device; and
   in response to analyzing the content, generate a suggestion for adding an action to the modifiable list of one or more actions.

\* \* \* \* \*